(12) United States Patent
Yamada et al.

(10) Patent No.: US 6,930,895 B2
(45) Date of Patent: Aug. 16, 2005

(54) COMPUTER POWER SUPPLY

(75) Inventors: Tomiji Yamada, Fuchu (JP); Akira Tatsumi, Fuchu (JP)

(73) Assignee: Nipron Co., Ltd., Osaka (JP)

( * ) Notice: Subject to any disclaimer, the term of this patent is extended or adjusted under 35 U.S.C. 154(b) by 113 days.

(21) Appl. No.: 10/676,047

(22) Filed: Oct. 2, 2003

(65) Prior Publication Data

US 2004/0085054 A1 May 6, 2004

(30) Foreign Application Priority Data

Nov. 1, 2002 (JP) ........................................ 2002-320308

(51) Int. Cl.[7] .......................... H02M 3/335; H02M 7/04
(52) U.S. Cl. ........................ 363/21.18; 363/89; 363/72; 323/222; 323/207
(58) Field of Search ........................... 363/21.12–21.18, 363/89, 72, 732, 81; 323/222, 282, 272, 207

(56) References Cited

U.S. PATENT DOCUMENTS

| 3,873,903 | A | * | 3/1975 | Koetsch et al. ................ 363/25 |
| 4,700,125 | A | * | 10/1987 | Takata et al. ................ 323/317 |
| 5,367,448 | A | * | 11/1994 | Carroll ........................ 363/89 |
| 5,656,923 | A | * | 8/1997 | Schultz et al. .............. 323/207 |
| 6,097,158 | A | * | 8/2000 | Manor et al. ................ 315/127 |
| 6,842,353 | B2 | * | 1/2005 | Yamada et al. ................ 363/89 |

FOREIGN PATENT DOCUMENTS

JP          7-231058          8/1995

* cited by examiner

*Primary Examiner*—Rajnikant B. Patel
(74) *Attorney, Agent, or Firm*—Armstrong, Kratz, Quintos, Hanson & Brooks, LLP

(57) ABSTRACT

An object of the present invention is to provide a computer power supply in which, by improving the circuit itself, internal heat loss can be reduced, thereby greatly improving efficiency. A partial resonance circuit 8 is constituted by a primary side winding N1 of a high frequency transformer 3, a resonance condenser 7, and two switching elements Q1, Q2, a secondary side output circuit 4 for driving a load is connected to a secondary side of the high frequency transformer 3 via a winding, and a reverse converter 11 for driving and halting the first switching element and second switching element by causing the respective phases thereof to differ on the basis of a driving signal is provided.

6 Claims, 7 Drawing Sheets

COMPUTER POWER SUPPLY

BACKGROUND OF THE INVENTION

1. Field of the Invention

The present invention relates to a computer power supply for driving various loads using, for example, a DC output following rectification by an AC side power circuit of an AC voltage from a commercial AC power supply or a DC voltage from a DC power supply such as a battery or secondary battery.

2. Description of the Related Art

When a switching power supply with a high output capacitance (200 to 300 W) is provided in a 1 U (height 44 mm units) size as the computer power supply described above, a large number of cooling fans are used conventionally in order to extract an output capacitance of 210 W or more due to the small size, and in so doing decreases in efficiency due to internal heat loss can be avoided. In many cases, however, efficiency of only 65% to 68% or thereabouts can be achieved, and moreover, power consumption increases as the number of cooling fans rises. As a result, considerable increases in efficiency cannot be achieved, and improvements are urgently desired.

A device which is constituted such that the internal temperature is maintained at a constant level at all times by modifying the discharge rate of the cooling fan in accordance with the amount of generated heat, which varies according to the load current, has also been proposed (see Japanese Unexamined Patent Application Publication 7-231058 (FIG. 1), for example).

In the aforementioned publication, the discharge rate of the cooling fan is reduced when the load current is small, and thus efficiency can be improved slightly in comparison with a device in which a large number of cooling fans are all driven. However, this device does not provide an ultimate solution.

SUMMARY OF THE INVENTION

The present invention has been designed in consideration of the situation described above, and it is an object thereof to provide a computer power supply in which efficiency is improved greatly by improving the circuit itself such that internal heat loss itself is reduced.

In order to solve the aforementioned problem, a computer power supply of the present invention is such that a first switching element and a second switching element operating with a DC voltage as an input are disposed on the primary side of a high-frequency transformer in a state of differing polarities, the first switching element is connected to one end of a primary side winding of the high-frequency transformer, and the second switching element is connected to the same end of the primary side winding as the connection side of the first switching element via a resonance condenser, whereby the primary side winding, resonance condenser, and two switching elements constitute a partial resonance circuit. A secondary side output circuit for driving a load is connected to the secondary side of the high-frequency transformer via a winding, a first driving circuit and a second driving circuit having a delay element are provided for driving and halting the first switching element and second switching element on the basis of a driving signal by causing the respective phases thereof to differ, and a reverse converter is provided for supplying to the input portion of one of the driving circuits insulation from the other driving circuit and a reverse input voltage.

By using the partial resonance circuit and reverse converter, drops in the flyback voltage generated when a forward converter is used can be avoided, and by providing the driving circuit with a delay element, when one of the two switching elements is not driven (OFF) and the other switching element is driven (ON), or conversely when one of the switching elements is driven (ON) and the other switching element is not driven (OFF), the part at which operation of the two switching elements overlaps can be reduced to the lowest level possible.

By constructing an arrangement wherein the reverse converter is disposed about an iron core such that the primary side winding and secondary side winding have differing polarities, both an insulation effect and a reverse output effect can be obtained.

By providing a magnetic amplifier having a dead angle in the secondary side output circuit or providing a magnetic snubber in a synchronous rectifier circuit, the outflow of the secondary side current can be delayed.

By connecting the primary side winding end and an earth side end of at least one of the switching elements in series via two condensers having differing capacities and connecting a diode in parallel to the condenser with the smaller capacity, switching loss when the switching elements are not driven (OFF) can be reduced.

Two auxiliary windings, which are different to an output winding provided on the secondary side of the high-frequency transformer, are disposed on the secondary side, two synchronous rectifier driving circuits for transferring the output from the primary side with little loss are connected to the two auxiliary windings respectively in a state of differing polarities, and a switching element for the two synchronous rectifier driving circuits, which is provided with an ON-OFF signal synchronously with the secondary voltage of the high-frequency transformer, is provided.

An ON-OFF signal is provided to each switching element of the switching elements for the two synchronous rectifier driving circuits synchronously with the secondary voltage of the high-frequency transformer. A secondary waveform from the reverse converter of the driving circuit of the first phase of the present invention provides OFF synchronicity with a sufficient voltage produced by the flyback energy, and thus in comparison with high-frequency diode rectification, the secondary voltage of the high-frequency transformer has power loss only of the ON resistor of the switching element. Thus high efficiency can be realized.

Two resistors for determining the ON periods of the first switching element and second switching element are connected to a PWM control circuit for outputting the driving signal so as to be parallel when a comparator for controlling the ON periods of the first switching element and second switching element is ON.

By means of such a constitution, when an input voltage is inputted or an ON signal from a remote controller is inputted, a soft start can be caused and the switching element does not attempt to rise in a fully open state (rise rapidly during a short ON period), and thus transients such as an overshoot or undershoot can be avoided.

BRIEF DESCRIPTION OF THE DRAWINGS

FIG. 4 is a view illustrating current flow when the first FET is OFF and the second FET is ON;

FIG. 6 is a view illustrating a secondary side current flow when the first FET is ON and a fourth FET is ON;

FIG. 7 is a view illustrating the secondary side current flow when the first FET is OFF and a fifth FET and sixth FET are both ON.

DESCRIPTION OF THE PREFERRED EMBODIMENTS

Figure 1:
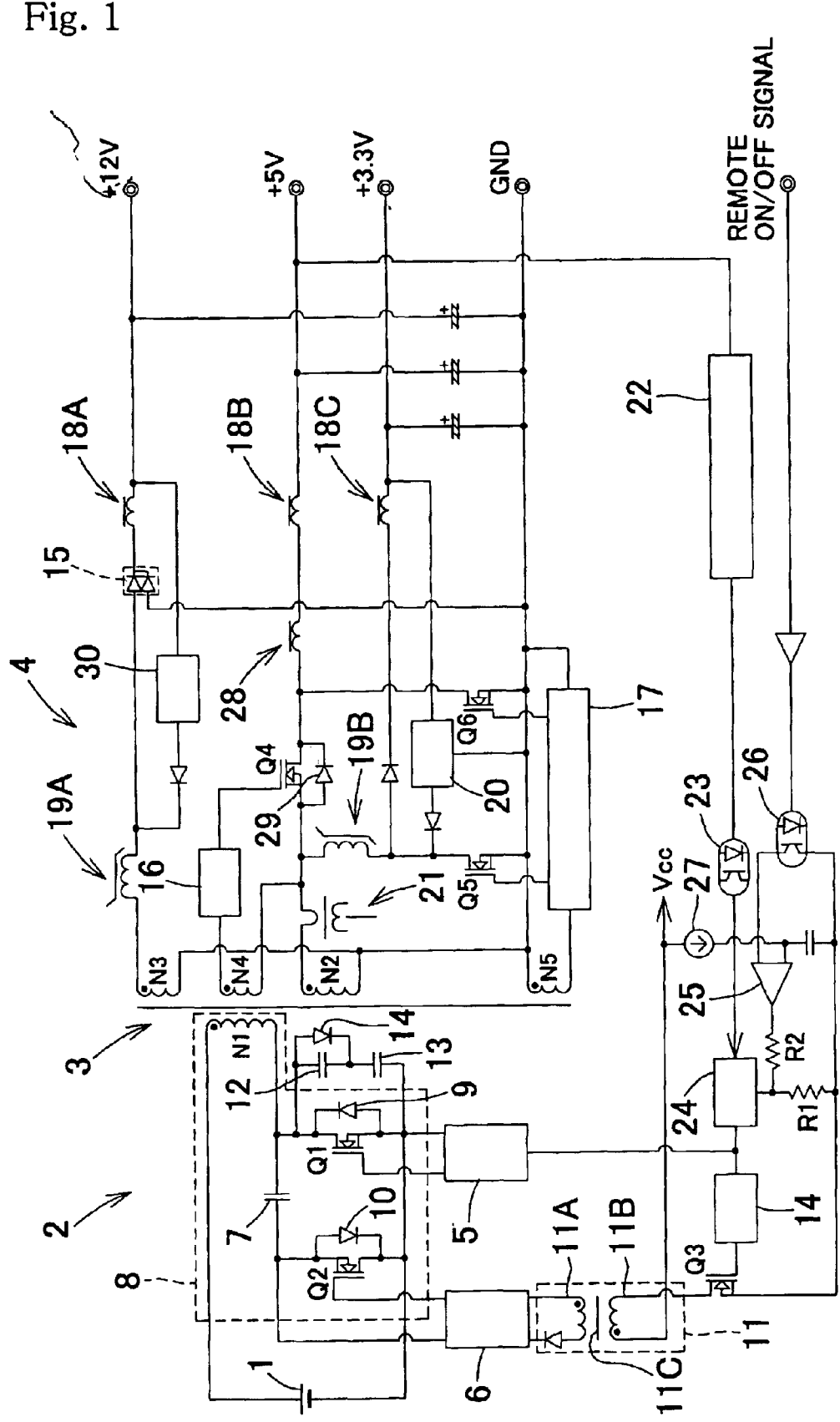
FIG. 1 is a schematic electric circuit diagram of a computer power supply.

FIG. 1 shows a computer power supply which is typically provided with a circuit for converting, for example, an AC voltage from a commercial AC power supply into a DC voltage by means of rectification and uses the DC voltage from the circuit. To facilitate description, however, the example shown in FIG. 1 comprises a battery 1 for generating a DC voltage, although the present invention is not limited thereto. The secondary side output shown in FIG. 1 is capable of extracting three output voltages of +12V, +5V, and +3.3V, but the number of outputs and the magnitudes of the output voltages may be set at will.

The computer power supply is constituted by a primary side switching circuit 2 which operates using the DC voltage of the battery 1 as an input, and a secondary side output circuit 4 provided on the secondary side of a high frequency transformer 3 for driving various devices of a computer using the output from the switching circuit 2 via the high frequency transformer 3.

The primary side switching circuit 2 connects a first FET (field effect transistor) Q1 serving as a first switching element and a second FET (field effect transistor) Q2 serving as a second switching element via a resonance condenser 7 to the negative pole side of a primary winding N1 provided on the primary side of the high frequency transformer 3 in a state of opposite polarities. More specifically, the drain side of the first FET Q1 and the cathode side of the second FET Q2 are connected respectively, a first driving circuit 5 having a delay element (a delay circuit, for example) which drives the first FET Q1 on the basis of a driving signal is connected between the gate and cathode of the FET Q1, and a second driving circuit 6 having a delay element (a delay circuit, for example) which drives the second FET Q2 on the basis of a driving signal is connected between the gate and cathode of the second FET Q2. The primary winding N1, the resonance condenser 7, and the two FETs Q1, Q2 constitute a partial resonance circuit 8 which is resonated only when the FETs Q1, Q2 are both OFF. Note that parasitic diodes 9, 10 are comprised in the interior of the FETs Q1, Q2 respectively.

A reverse converter 11 is provided between the first driving circuit 5 and second driving circuit 6 for giving insulation between the two driving circuits 5, 6 and supplying a reverse output voltage to the second driving circuit 6.

The reverse converter 11 is constituted such that a primary side winding 11B and a secondary side winding 11A are disposed about an iron core 11C in a state of opposite polarities, or in other words if the right side of the primary side winding 11B in the drawing is set as a negative pole, the right side of the secondary side winding 11A becomes a positive pole, and thus a flyback voltage from the primary side winding 11B when a third FET Q3 is OFF can be transferred to the secondary side winding 11A in a reversed state. The third FET Q3 is provided as a third switching element for driving the reverse converter 11. The reference symbol 14 in FIG. 1 is a third driving circuit which is connected to the gate of the third FET Q3 to drive the third FET Q3 on the basis of a driving signal from a PWM control circuit 24 to be described below.

By connecting the primary side winding N1 end (drain side) and the earth (cathode) end of the first FET Q1 in series via two condensers 12, 13 with differing capacitance, and connecting the condenser 12 with the smaller capacitance in parallel with a diode 14, switching loss when the first FET Q1 is OFF can be reduced.

Figure 2:
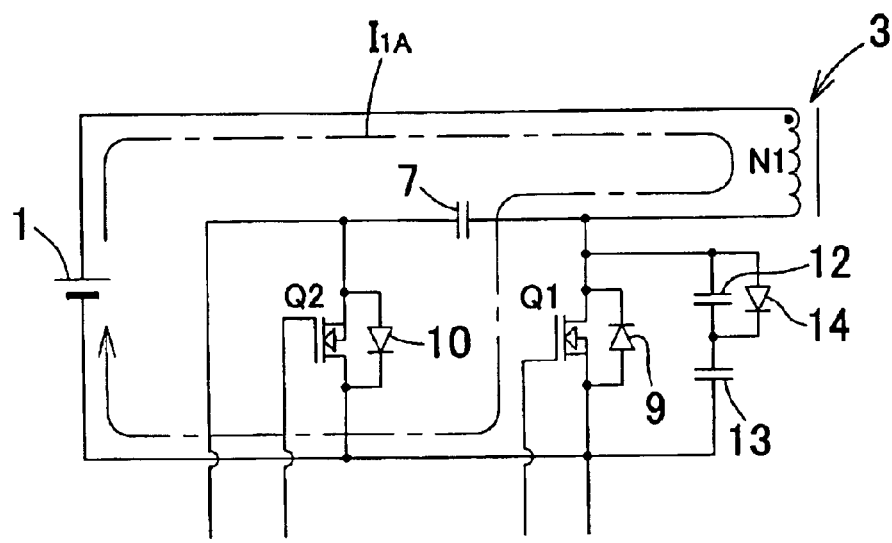
FIG. 2 is a view illustrating current flow when a first FET is ON and a second FET is OFF.
Figure 3:
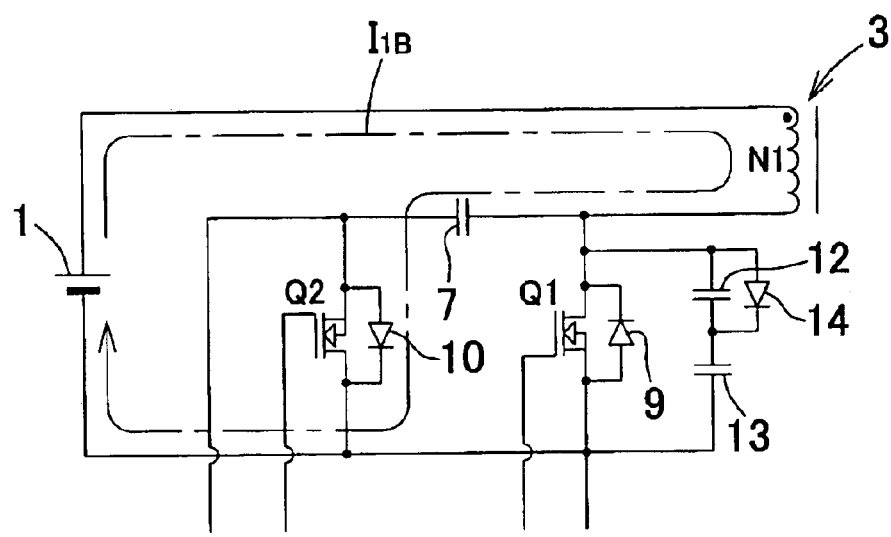
FIG. 3 is a view illustrating current flow when the first FET and second FET are both OFF.
Figure 4:
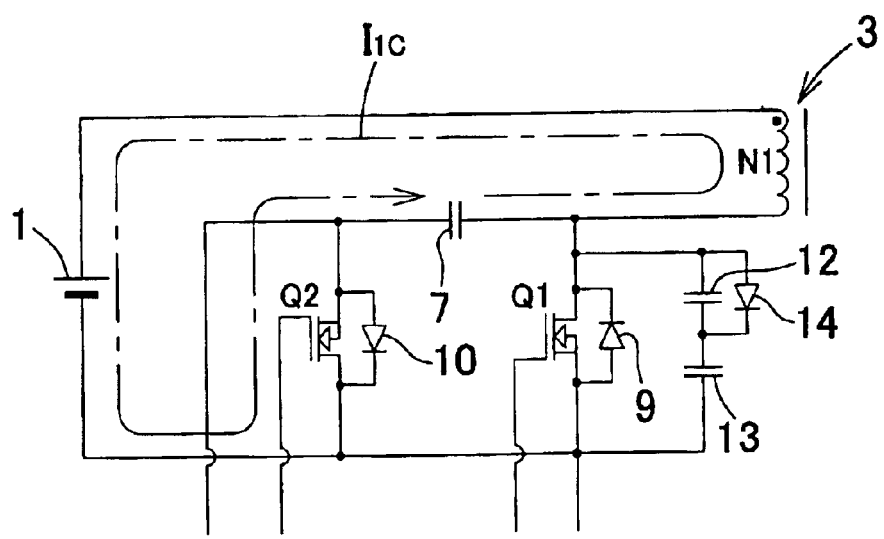

To describe the operations of the first FET Q1 and second FET Q2, when the first FET Q1 is switched ON (and the second FET Q2 with a different polarity is OFF) by a driving signal from the PWM control circuit to be described below which is outputted from the first driving circuit 5, a current $I_{1A}$ flows as shown in FIG. 2. Next, when the first FET Q1 is switched OFF, a current $I_{1B}$ flows along the parasitic diode 10 as shown in FIG. 3 in order to charge the resonance condenser 7. By providing the second FET Q2 such that the excitation of the high-frequency transformer 3 is reset by causing a flyback counter-electromotive force of the high-frequency transformer 3 to flow into the resonance condenser 7, switching loss when the first FET Q1 is turned OFF can be reduced. In other words, when the second FET Q2 is not provided, the flyback voltage of the high frequency transformer 3 rises rapidly when the first FET Q1 is OFF, causing a large amount of turn-off loss which is generated during a cross when the drain current flowing into the first FET Q1 is turned OFF. When charging of the resonance condenser 7 is complete, the second FET Q2 switches ON (the first FET Q1 remains OFF), and the energy stored in the resonance condenser 7 is discharged such that a current $I_{1C}$ flows as shown in FIG. 4. When discharge is complete, the first FET Q1 turns ON again, and the operation described above is repeated. When the first FET Q1 switches ON, if the second FET Q2 is not provided, falling of the voltage between the drain and source of the first FET Q1 is delayed, and turn-on loss increases as the ON current of the first FET Q1 rises.

The secondary side output circuit 4 comprises four windings N2, N3, N4, and N5 disposed on the secondary side of the high frequency transformer 3. The positive pole side of the winding N3 positioned on the upper side of the drawing is connected via a magnetic amplifier 19A to a high-speed rectifier diode 15 serving as a secondary side rectifying element, and thus a +12V voltage can be obtained. However, a FET or the like may be used in the flywheel side diode in order to suppress power loss. Further, by connecting two synchronous rectifier driving circuits 16, 17 for transferring the output from the primary side with little loss to the winding N2 positioned third from top in a state in which the polarities of the two auxiliary windings N4, N5 positioned second and fourth from top are different from one another, or in other words by connecting the first synchronous rectifier driving circuit 16 on the upper side to the positive pole side of the winding N4, connecting the second synchronous rectifier driving circuit 17 on the lower side to the negative pole side of the winding N5, and providing a fourth FET Q4 serving as a synchronous rectifier side switching element and a fifth FET Q5 and sixth FET Q6 serving as flywheel side switching elements, which switch ON and OFF on the basis of an output signal from the two synchronous rectifier driving circuits 16, 17, a synchronous rectifier circuit is provided. When the fourth FET Q4 switches ON while the first FET Q1 is ON, +3.3V and +5V are outputted, and when the flywheel side fifth FET Q5 and sixth FET Q6 switch ON while the first FET Q1 is OFF, the three FETs Q4, Q5, and Q6 are respectively connected so as to output +3.3V and +5V by the counter-electromotive force of choke coils 18C, 18B. The reference symbol 30 in FIG. 1 is a magnetic amplifier 19A controlling circuit for controlling a +12V output to a constant voltage, and the reference symbol 20 is a magnetic amplifier 19B controlling circuit for controlling the +3.3V output to a constant voltage. The reference symbol 21 shown in FIG. 1 is a current transformer for detecting an overcurrent which constitutes an overcurrent protection circuit not shown in the drawing. As described above, a +12V output is obtained by means of rectification using the high-speed rectifier diode 15, and thus power loss due to the VF (forward threshold voltage) of the flywheel side diode (high-speed rectifier diode) 15 increases. Hence, by connecting a FET which is driven by the synchronous rectifier driving circuit 17 similarly to the fifth and sixth FETs Q5, Q6 in place of the flywheel side diode (high-speed rectifier diode) 15 which operates in a similar manner to the fifth and sixth FETs Q5, Q6, power loss can be suppressed to a low level.

Figure 6:
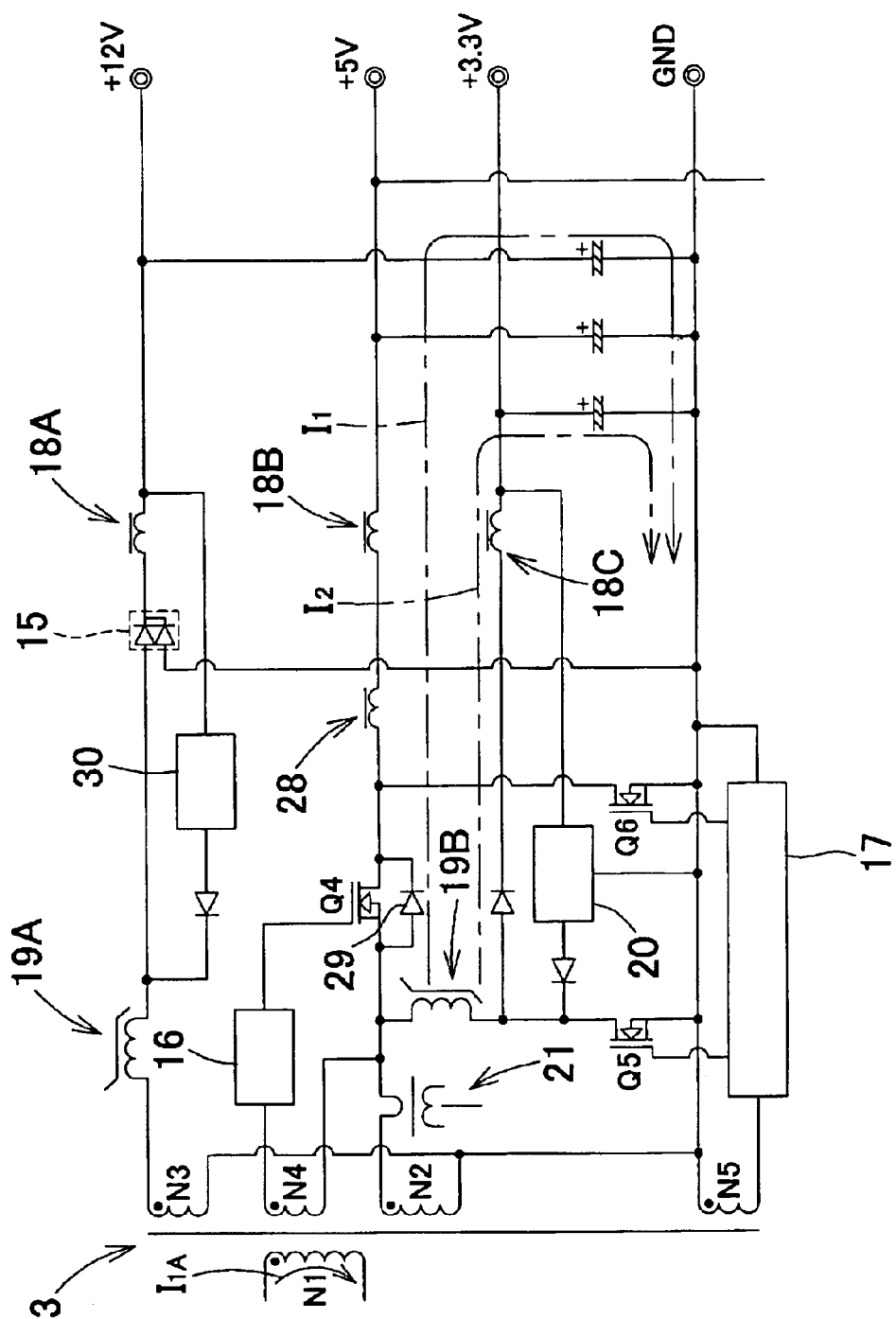

To describe operations of the fourth FET Q4, fifth FET Q5, and sixth FET Q6 using FIG. 6, first, the first FET Q1 is switched ON and the current $I_{1A}$ shown in the drawing flows into the primary side winding N1, whereby the output of the first synchronous rectifier driving circuit 16 is received such that the fourth FET Q4 switches ON. As a result, a current $I_1$ flows so as to generate a +5V output and a current $I_2$ flows so as to generate a +3.3V output, as shown in FIG. 6.

Figure 7:
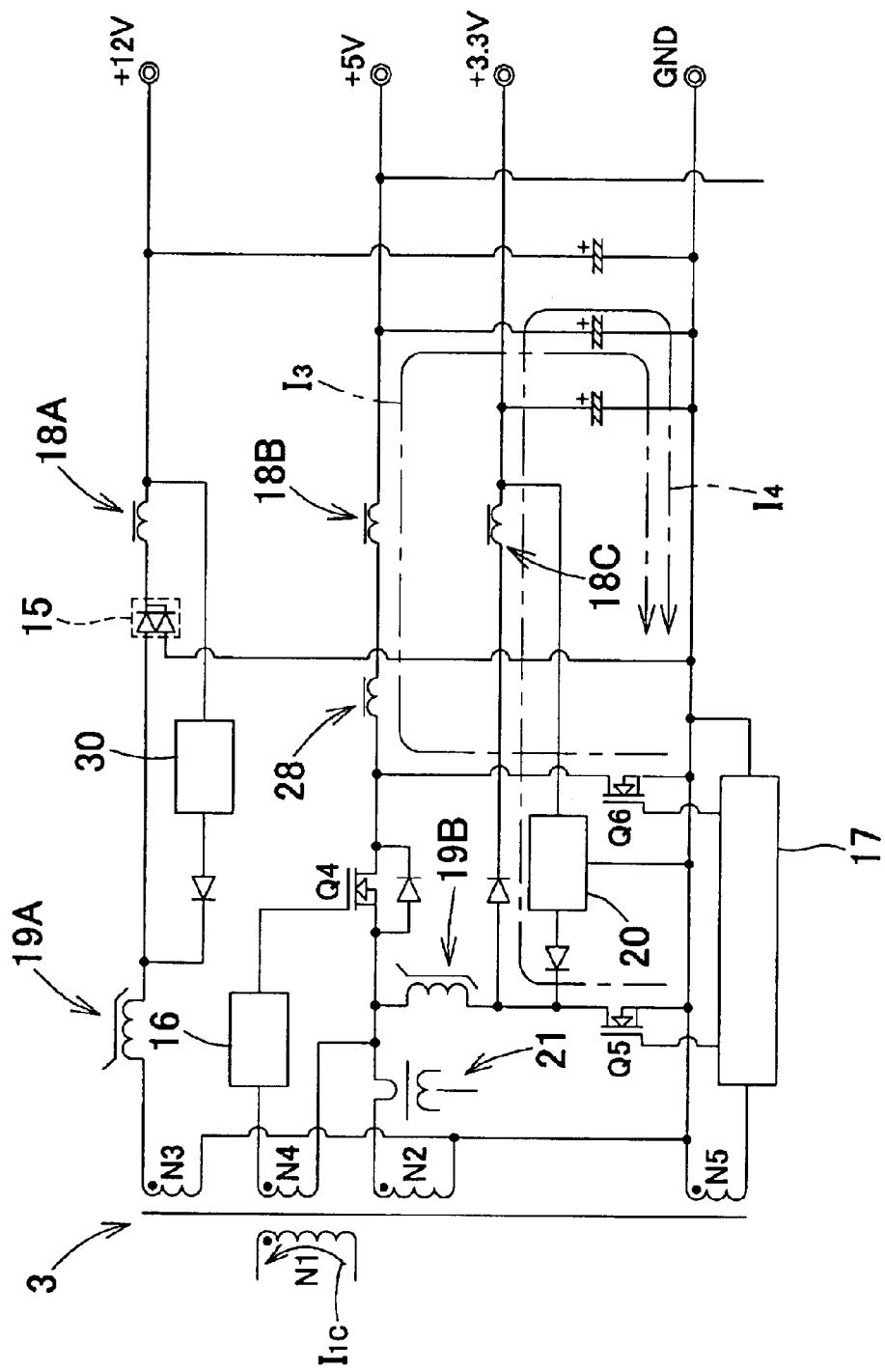

When the first FET Q1 is switched OFF, the energy which was accumulated in the smoothing choke coils 18B, 18C while the first FET Q1 was ON is discharged as a counter-electromotive force, and thus the output of the second synchronous rectifier driving circuit 17 is received to switch the fifth FET Q5 and sixth FET Q6 ON. As a result, a current $I_3$ flows so as to generate a +5V output and a current $I_4$ flows so as to generate a +3.3V output, as shown in FIG. 7.

Figure 8:
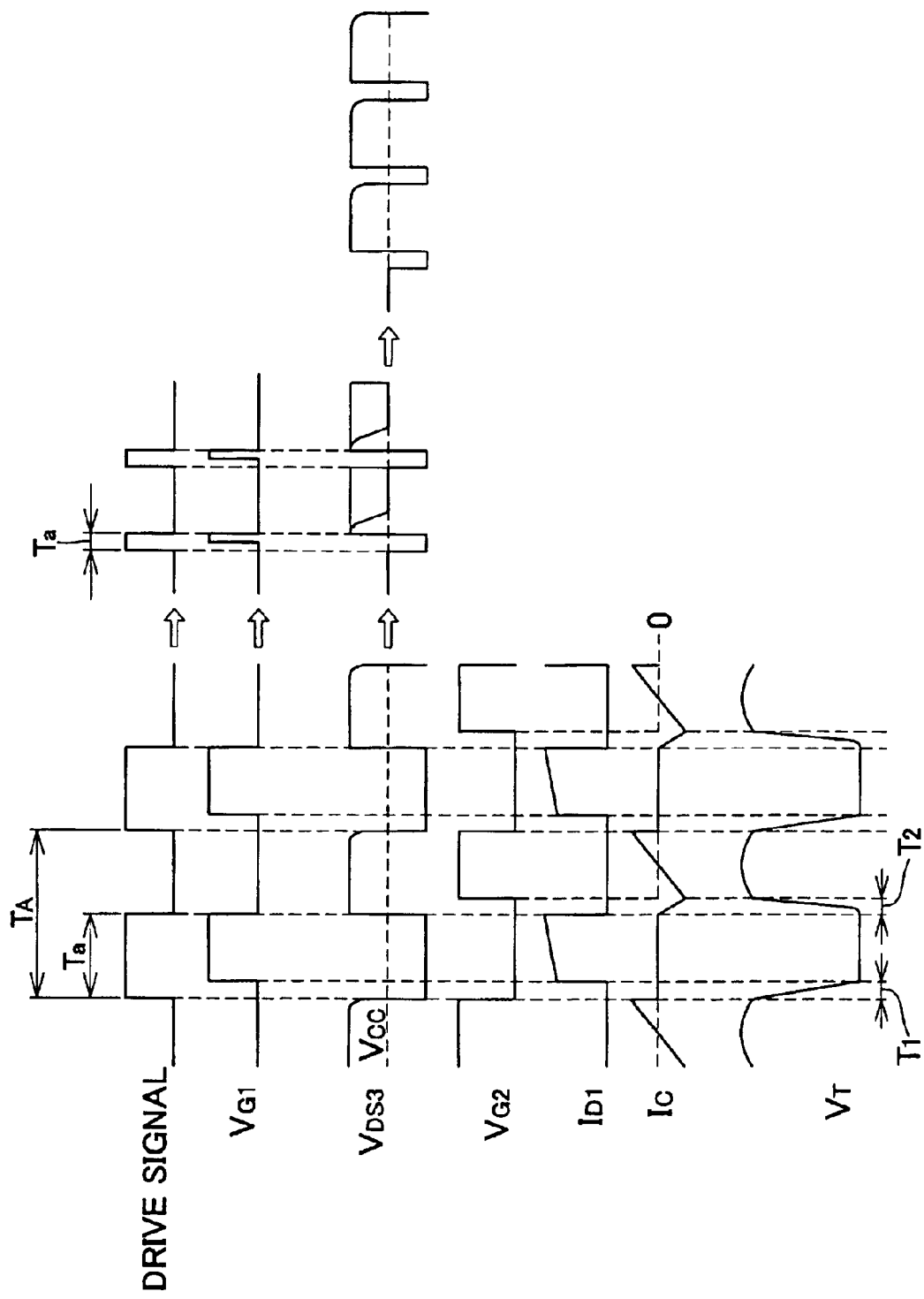
FIG. 8 is a time chart showing the elapse of time of a voltage waveform and current waveform in a specified location on the primary side and a voltage waveform on the secondary side.

As shown in FIG. 1, the magnetic amplifiers 19A, 19B, each having a dead angle, are connected to the two windings N2, N3 respectively, and thus the dead angle (also known as a conduction angle) in the T1 region in FIG. 8 is used to delay outflow of the secondary side current such that loss of the ZVS (zero voltage switching) function can be prevented. Note that by using a magnetic snubber 28 in series with the +5V rectifier FET Q4 in which a magnetic amplifier is not inserted (not switched ON), similar effects to a case in which the magnetic amplifier 19 is provided can be attained. Note that in the case of a multi-output, the two components can be used in conjunction. The reference symbol 29 in FIG. 1 is a parasitic diode comprised in the interior of the fourth FET Q4.

As shown in FIG. 1, the PWM control circuit 24 is provided for generating a driving signal by inputting the output of a +5V constant voltage control circuit 22 via a photocoupler 23, and two resistors R1, R2 for determining the amount of time the first FET Q1 and second FET Q2 are to be ON are connected to the PWM control circuit 24 so as to be parallel when a comparator 25 for controlling the ON times of the first FET Q1 and second FET Q2 is ON. A remote signal is inputted into the reference voltage input side of the comparator 25 via a photocoupler 26.

Typically, when an input voltage is inputted or an ON signal from a remote controller is inputted, the first FET Q1 and second FET Q2 attempt to rise while fully open (the FETs are fully open during an ON period in order to trigger an output quickly), and thus transients such as an overshoot or undershoot occur. By altering the ON period as described above, the first FET Q1 and second FET Q2 are caused to soft start, enabling a smooth rise without the occurrence of transients during the output voltage rise time. The reference symbol 27 in FIG. 1 is a constant current circuit.

Figure 5:
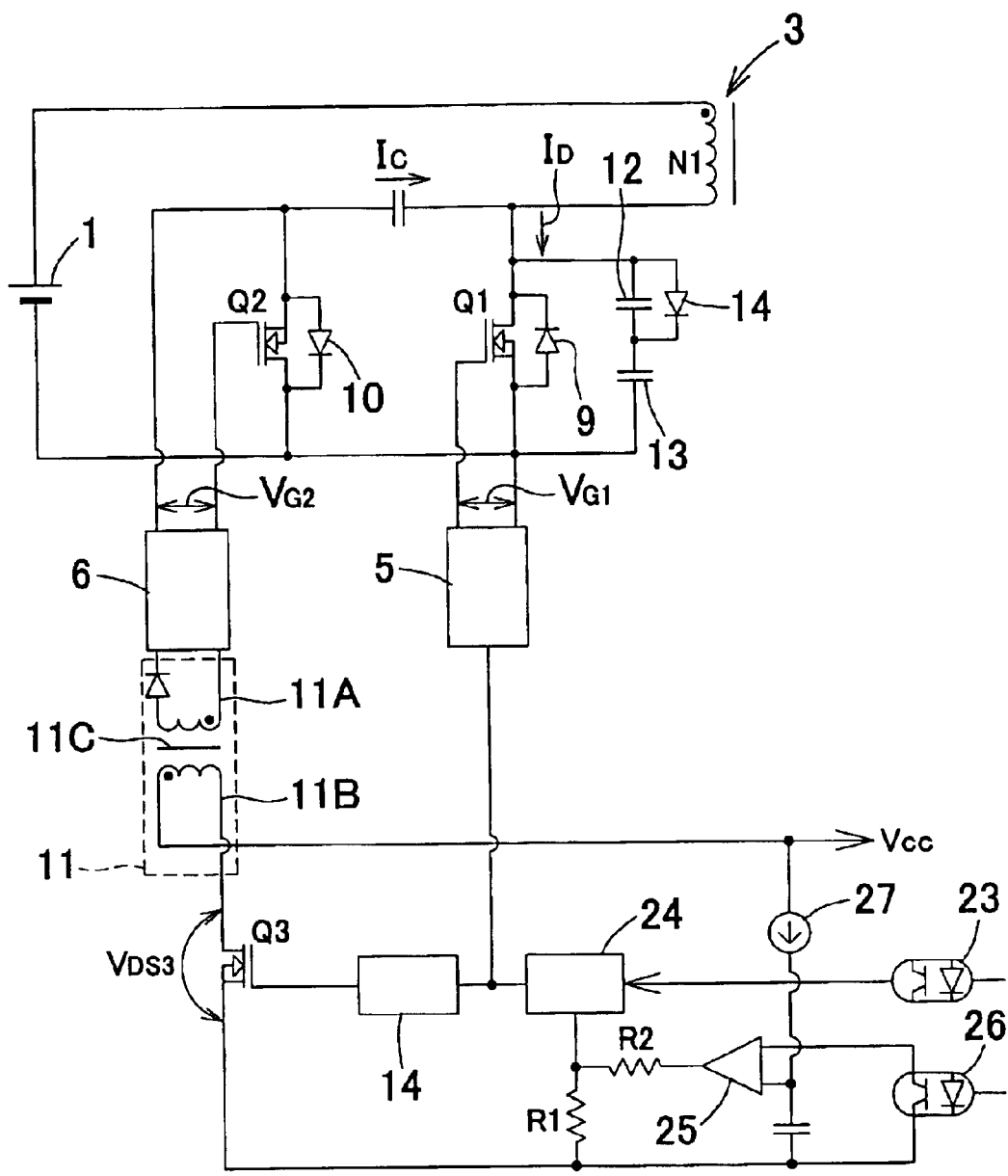
FIG. 5 is a view showing a primary side switching circuit of the computer power supply.

To describe operations of the present invention using the time chart shown in FIG. 8, when a drive signal (the aforementioned driving signal) is outputted in a cycle $T_A$, the ON period $T_a$ becomes extremely narrow during dropping circuit operations and the like, as shown on the right-hand side of the drawing. Then, by ON-OFF controlling the FETs Q1, Q2 in the driving circuits 5, 6 by means of the aforementioned drive signal, the gate voltage $V_{G2}$ of the second FET Q2 switches to an analogous opposite phase to the gate voltage $V_{G1}$ of the first FET Q1. At this time, the rise time of the gate voltage $V_{G1}$ of the first FET Q1 is delayed in respect of the rise time of the drive signal by T1, and the rise time of the gate voltage $V_{G2}$ of the second FET Q2 is delayed in respect of falling of the drive signal by T2. When a typical forward converter (ON/ON circuit) is used as the driving circuit of the second FET Q2, the drain-source voltage $V_{DS3}$ of the third FET Q3 drops at a certain point, as shown in the center of the drawing, but by using the reverse converter 11 (ON-OFF circuit) according to the present invention, the voltage can be set in a substantially rectangular-form wave which does not drop, as shown on the right-hand side of the drawing. The reference symbol $I_{D1}$ in FIG. 7 indicates the drain current of the first FET Q1. This is indicated by $I_D$ in FIG. 5. $V_T$ indicates the primary side and secondary side voltages of the high-frequency transformer 3.

According to the first and second phase of the present invention, a partial resonance circuit and a reverse converter are used, and thus the driving voltage (more specifically, the gate voltage VG2) can be prevented from dropping. Moreover, by providing the driving circuit with a delay element, switching loss can be reduced, and thus a computer power supply in which efficiency is increased by at least 5% or more (to between 70% and 75%) compared to a conventional device using cooling fans can be provided.

According to the third phase of the present invention, a magnetic amplifier having a dead angle is provided in the secondary side output circuit or a magnetic snubber is provided in the synchronous rectifier circuit, and thus outflow of the secondary side current can be delayed and the loss of the ZVS (zero voltage switching) function can be prevented.

According to the fourth phase of the present invention, the primary side winding end and an earth side end of at least one of said switching elements are connected in series to two condensers having differing capacitance, and a diode is connected in parallel to the condenser with the smaller capacitance, and thus switching loss when the switching elements are not being driven (OFF) can be reduced, thereby enabling a further improvement in efficiency.

According to the fifth phase of the present invention, two auxiliary windings which are different to an output winding provided on the secondary side are disposed on the secondary side, two synchronous rectifier driving circuits for transferring the output from the primary side with little loss are connected to the two auxiliary windings respectively in a state of differing polarities, and a switching element for the two synchronous rectifier driving circuits, which is provided with an ON-OFF signal synchronously with the secondary voltage of the high-frequency transformer, is provided. Thus the switching elements can be switched ON and OFF smoothly, and since the windings of the transformer are used, synchronous timing is easy.

According to the sixth phase of the present invention, when an input voltage is inputted or an ON signal is inputted from a remote controller, the switching elements can be caused to rise smoothly without the occurrence of transients during the rise of the output voltage.

What is claimed is:

1. A computer power supply wherein a first switching element and a second switching element operating with a DC voltage as an input are disposed on the primary side of a high-frequency transformer, said first switching element is connected to one end of a primary side winding of said high-frequency transformer, and said second switching element is connected to the same end of the primary side winding as the connection side of said first switching element via a resonance condenser and in a state of differing polarity to said first switching element, said primary side winding, resonance condenser, and two switching elements constituting a partial resonance circuit, a secondary side output circuit for driving a load is connected to the secondary side of said high-frequency transformer via a winding, a first driving circuit and a second driving circuit having a delay element are provided for driving and halting said first switching element and second switching element on the basis of a driving signal by causing the respective phases thereof to differ, and a reverse converter is provided for supplying to the input portion of one of said driving circuits insulation from the other of said driving circuits and a reverse input voltage.

2. The computer power supply according to claim 1, wherein said reverse converter is disposed about an iron core such that the primary side winding and secondary side winding have differing polarities.

3. The computer power supply according to claim 1, wherein a magnetic amplifier having a dead angle is provided in said secondary side output circuit or a magnetic snubber is provided in a synchronous rectifier circuit.

4. The computer power supply according to claim 1, wherein said primary side winding end and an earth side end of at least one of said switching elements are connected in series via two condensers having differing capacitance, and a diode is connected in parallel to the condenser with the smaller capacitance.

5. The computer power supply according to claim 1, wherein two auxiliary windings, which are different to an output winding provided on the secondary side of said high-frequency transformer, are disposed on said secondary side; two synchronous rectifier driving circuits for transferring the output from the primary side to said two auxiliary windings with little loss are connected to the two auxiliary windings respectively in a state of differing polarities; and switching elements for said two synchronous rectifier driving circuits are provided, which are bestowed with an ON-OFF signal synchronously with the secondary voltage of said high-frequency transformer.

6. The computer power supply according to claim 1, wherein two resistors for determining the ON periods of said first switching element and second switching element are connected to a PWM control circuit for outputting said driving signal so as to be parallel when a comparator for controlling the ON periods of said first switching element and second switching element is ON.

* * * * *